United States Patent [19]

Small

[11] Patent Number: 4,631,653

[45] Date of Patent: Dec. 23, 1986

[54] CAPACITOR COUPLED CURRENT MODE BALANCE CIRCUIT

[75] Inventor: Kenneth T. Small, Cupertino, Calif.

[73] Assignee: Boschert Incorporated, Milpitas, Calif.

[21] Appl. No.: 614,420

[22] Filed: May 25, 1984

[51] Int. Cl.[4] .......................................... H02M 3/335
[52] U.S. Cl. ....................................... 363/17; 363/98; 363/132
[58] Field of Search ...................... 363/17, 25, 26, 98, 363/132, 134, DIG. 1

[56] References Cited

U.S. PATENT DOCUMENTS

| | | | |
|---|---|---|---|
| 3,859,583 | 1/1975 | Reed | 363/26 |
| 3,859,586 | 1/1975 | Wadlington | 363/25 |
| 3,870,943 | 3/1975 | Weichedel et al. | 363/26 |
| 4,002,963 | 1/1977 | Hunter | 363/80 |
| 4,233,658 | 11/1980 | Lupatin et al. | 363/26 |
| 4,351,020 | 9/1982 | Leti et al. | 363/26 |
| 4,404,623 | 9/1983 | Jourdan | 363/17 |
| 4,429,359 | 1/1984 | Anderson | 363/98 |
| 4,477,867 | 10/1984 | Pellegrino | 363/26 |

OTHER PUBLICATIONS

Chryssis, George "High-Frequency Switching Power Supplies", pp. 28-31, McGraw-Hill, 1984.

Primary Examiner—Peter S. Wong
Assistant Examiner—Jeffery Sterrett
Attorney, Agent, or Firm—Kenneth E. Leeds; Alan H. MacPherson; Steven F. Caserza

[57] ABSTRACT

A control circuit is provided for controlling the on-time of a pair of switching transistors in a half bridge converter. The control circuit includes a first comparator for comparing the converter output voltage with a reference voltage. The control circuit also includes a circuit which generates a first signal indicative of the current through the primary winding of the converter output transformer. Also included is a circuit which generates a second signal indicative of the on-time of one of the switching transistors exceeding the on-time of the other switching transistor. The first and second signals are averaged and compared with the output voltage of the first comparator by a second comparator. The second comparator controls the on-time of the switching transistors. In this way, any imbalance in the on-time of the switching transistors is corrected by the control circuit.

12 Claims, 13 Drawing Figures

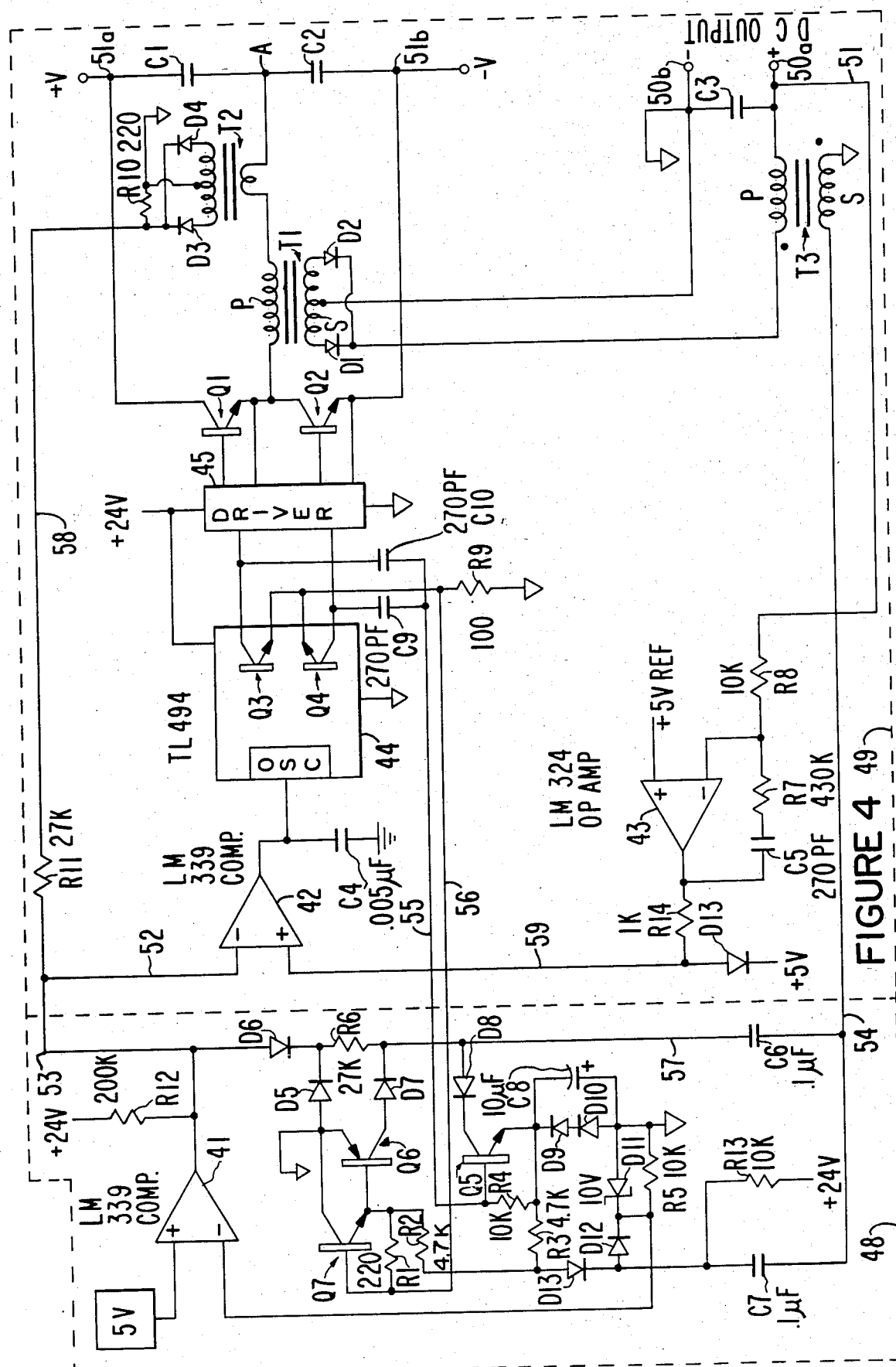

FOR $V_{C_2} > V_{C_1}$ SHOWING CORRECTION

CAPACITOR COUPLED CURRENT MODE BALANCE CIRCUIT

BACKGROUND OF THE INVENTION

1. Field of the Invention

This invention relates to switching power supplies and in particular to a switching power supply with a current mode control loop.

2. Prior Art

Current mode controlled switching power supplies are well known. In a current mode controlled switching power supply, the output voltage from the power supply is measured and compared to a reference voltage. Any error signal resulting from a difference between the two voltages is then used to control the peak switch current from the power switch on a cycle-by-cycle basis. It is known that in a normal current mode controlled switching power supply a capacitor cannot be used to couple the input of the power transformer to the power switches because such a capacitor results in an instability which causes the power supply to latch up. The use of such a coupling capacitor is desirable to prevent transformer saturation due to DC currents through the transformer.

FIG. 1 illustrates a dual loop current mode switching power supply of the prior art and FIG. 2a illustrates a half bridge converter circuit wherein two capacitors replace two switching transistors normally present in a full bridge of a type known in the prior art. In the circuit of FIG. 1, the output voltage on lead 22 from the power supply (often called a "converter") is sent to error amplifier 25 on the inverting input lead 27a of amplifier 25. Voltage reference 28 is applied to the noninverting input lead 27b of error amplifier 25. The output signal from amplifier 25 comprises an error voltage which represents the difference between the voltage on output lead 22 and reference voltage 28. This error voltage controls the current source loop 30 which in turn controls the peak switch current from power switch 23 on a cycle-by-cycle basis. The second loop 30 includes a comparator 26 which senses the difference between the error voltage from error amplifier 25 and a signal produced by current sense circuit 27 proportional to the peak switch current from power switch 23 on a cycle-by-cycle basis. When the power switch 23 is configured as a push-pull circuit, loop 30 corrects for transformer imbalances caused by, for example, differences between storage times of switch transistors (such as transistors Q1 and Q2 in FIG. 2a), noise and load transients which can cause transformer flux saturation and thus excessive DC current in the switching transistors.

Different forms of dual loop current mode control have been utilized for their advantages of speed, performance and reliability. Unfortunately, none of these are usable with "half bridge" converter topologies, or with other push-pull topologies that are capacitor coupled to the output transformer. This is because the introduction of one or more capacitors to the circuit results in an instability which causes the system to latch up in a failure mode. FIG. 2a illustrates a typical capacitor coupled topology employing a half bridge. In FIG. 2a switching transistors Q1 and Q2 are driven by a control circuit and comprise part of power switch 23 shown in FIG. 1.

In the circuit of FIG. 2a when switch SW1 comprising transistor Q1 is on, current flows from the +V input lead through transistor Q1 and through the primary to node A. This current then charges capacitor C2 and discharges capacitor C1. When transistor Q1 shuts off and transistor Q2 comprising switch SW2 turns on, current $I_1$ flows in the opposite direction and discharges capacitor C2 and charges capacitor C1. During the flow of the current $I_1$ through the primary PRI in one direction or the other, current sense circuit 27 detects the magnitude of this current. Simultaneously with the current flow through the primary PRI, a current is generated in the secondary winding SEC of transformer T1. This secondary current is passed through a rectifier and a choke corresponding to choke 24 as shown in FIG. 1 and then stored on an output capacitor corresponding to C29 in FIG. 1.

One problem with the circuit of FIG. 2a is that while the voltage at node A theoretically should average precisely halfway between $+V$ and $-V$, in reality the voltage on node A can easily deviate slightly from this ideal. The circuit then forces the voltage on node A either to approximately $+V$ or $-V$ depending upon the direction of the initial unbalance in this voltage. Typically, this takes between 3 and 20 cycles.

Transistors Q1 and Q2 each turn off only when the corresponding current $I_1$ or $I_2$ through the primary PRI reaches a maximum value as determined by the error voltage from amplifier 25. The length of time for this current to reach this maximum value depends upon the charge on C1 when Q1 turns on and the charge on C2 when Q2 turns on. The result is that the current $I_1$ flows for a much longer duration when V1 is much less than V2, as shown in FIG. 3, than the current $I_2$ in the other direction. Therefore the charges on capacitors C1 and C2 will continue to diverge in magnitude and ultimately most of the voltage across the half bridge circuit will be taken across capacitor C2 for the current imbalance shown in FIG. 3.

In any current mode control loop such as shown in FIG. 1, the switches in power switch 23 (corresponding to transistors Q1 and Q2 in FIG. 2a) are turned off at a control current that is the same for the positive and negative current flows $I_1$ and $I_2$ through the primary of transformer T1. Thus maximum current $I_1$ and maximum current $I_2$ as shown in FIG. 3 are the same and are set by the error voltage from error amplifier 25 (FIG. 1). If V1 and V2 are equal (i.e., the voltages across capacitor C1 and capacitor C2 are equal) the slopes S1 and S2 of the current pulses shown in FIG. 3 as illustrated will be equal because the slopes are approximately proportional to the voltages V1 and V2 across capacitors C1 and C2. These voltages control the rate of current rise in the output filter (corresponding to output choke 24 in FIG. 1) and the output transformer (corresponding to transformer T1 shown in FIG. 2a). This is not a stable situation as discussed above and is similar to a pencil balanced on its point. Just as any slight noise will cause the pencil to fall if there is a slight difference between V1 and V2 (for example if V2 is slightly greater than V1) the difference will increase until V2 is almost double its original value and V1 is almost zero. This occurs because a higher voltage across C2 causes a quicker rise (increase in the slope S2) of inductive current through the primary PRI of transformer T1 and a shortening of the on time of transistor W1. The opposite is true for the on-time of the current $I_1$, through transistor Q1 with lower slope S1. Switch SW1 will eventually remain on until it is turned off other than by reaching its current limit.

Note that each transistor Q1 and Q2 is turned off when the current $I_1$ or $I_2$ equals Max $I_1$ or Max $I_2$ respectively. Max $I_1$ has the same absolute magnitude as Max $I_2$. If the voltage V2 across capacitor C2 is approximately the same value as the voltage $+V$ to $-V$ across the half bridge converter, when transistor Q2 turns on, the current through transistor Q2 from capacitor C2 will reach Max $I_2$ in a very short time. Thus, the charge on capacitor C2 will not be substantially depleted before the signal from comparator 26 shuts off the transistor Q2. Transistor Q1 is then turned on. Unfortunately, the voltage V1 across capacitor C1 is very small. Therefore, the rate of rise of the current $I_1$ through transistor Q1 is very low and consequently a long time will elapse before this current reaches the maximum current at which the signal from comparator 26 will shut off transistor Q1. Indeed, if capacitor C2 is charged to voltage V2 and V2 equals the voltage across the half bridge circuit ($+V$ to $-V$), the current $I_1$ will drop to zero rather than increase to Max $I_1$. Thus, the half bridge converter will have "latched up" and will no longer switch unless a circuit is provided to switch Q1 automatically after the lapse of a given time. However, this still will not prevent the half bridge circuit from latching up with the voltage across one of the capacitors being grossly different from the voltage across the other capacitor.

In any event, within a few dozen switch cycles at most, the converter will latch up and provide very close to zero output current. It makes no difference if other control methods are used, such as fixed off time or hysteresis control of current level, for two examples. The above-described problem exists with any current turn off control that uses capacitive coupling such as capacitors C1 and C2 of FIG. 2a. Even a full bridge converter using current mode control will latch up if a capacitor is inserted in series with the primary of the output transformer. This precludes the utilization of a capacitor to prevent destructive currents under some transient or imbalance conditions in full bridge converters.

SUMMARY OF THE INVENTION

This invention overcomes the prior art latch up problem of a half bridge or full bridge capacitor coupled switching circuit (also called a "power stage") by adding a "balance circuit" to the converter. The balance circuit prevents the circuit from latching up initially upon turn on of the circuit or while the circuit is operating and indeed has enough capability to rebalance the circuit should the circuit initially start in a latched-up condition or otherwise latch up for any reason.

This invention will be more fully understood in conjunction with the following detailed description taken together with the following drawings.

DESCRIPTION OF THE DRAWINGS

FIG. 2a illustrates a known half bridge capacitor coupled power stage previously not capable of being used as part of the power switch 23 of the structure of FIG. 1 while

FIG. 4 illustrates the switching power supply circuitry incorporating the balance circuit of this invention to prevent latch up.

DETAILED DESCRIPTION

The following detailed description illustrates one embodiment of this invention. This description is meant to be illustrative and not limiting and other embodiments of this invention will be obvious in view of this description to those skilled in the art.

In the structure of FIG. 4 the circuitry within the dashed lines 49 is, except for capacitors C9 and C10 and leads 55 and 56, conventional prior art circuitry and will be described briefly. The circuitry within the dashed lines 48 together with capacitors C9 and C10 and leads 55 and 56 comprises the balance circuitry of this invention which functions to prevent latch up of the power supply. The use of a half bridge circuit in a power supply in accordance with this invention is desirable because it allows transistors Q1 and Q2 to have lower voltage ratings than would otherwise be the case with a comparable push-pull circuit. Accordingly, the cost of the circuit can be significantly reduced although the current through each transistor is increased in proportion to the reduction of voltage. The balance circuit of this invention makes possible the use of a half bridge circuit with a current mode controlled power supply.

Figure 2A:
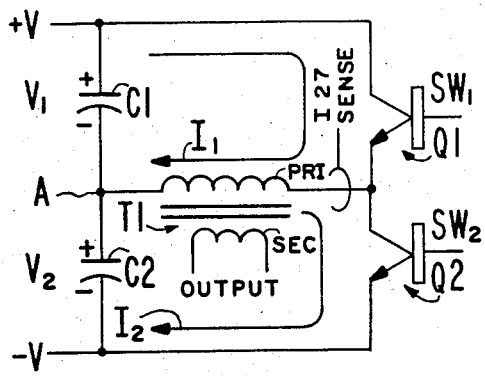

In the structure of FIG. 4, transistors Q1 and Q2 together with transformer T1 and capacitors C1 and C2 operate as described above in conjunction with FIG. 2a. Transistors Q1 and Q2 are switched on and off by switching transistors Q3 and Q4 which are part of and internal to the controller integrated circuit 44 for a switching mode power supply. The output current from the secondary of transformer T1 is rectified by diodes D1 and D2 and applied through a choke (which is shown as the primary of a coupling transformer T3) to charge capacitor C3. The DC output voltage from the power supply is taken from leads 50a, 50b across capacitor C3.

The positive voltage on capacitor C3 is transmitted by lead 51 through resistor R8 to the inverting input lead of operational amplifier 43. Connected to the noninverting input lead of operational amplifier 43 is a reference voltage shown in FIG. 4 as five (5) volts. Of course, this reference voltage could be any other appropriate voltage desired. A feedback circuit containing the series connected capacitor C5 and resistor R7 connects the output lead from operational amplifier 43 to the inverting input lead of amplifier 43 to provide high frequency compensation and gain roll off. The output signal from amplifier 43 is applied to noninverting input lead of comparator 42. Comparator 42 produces an output signal when the current through primary P of output transformer T1 (as represented by the value of the signal on the inverting input lead to comparator 42) reaches a value represented by the signal on the noninverting input lead to comparator 42. In accordance with this invention the signal on the inverting input lead to comparator 42 can have a first value when Q1 is on, and a second value when Q2 is on, wherein the first and second values are automatically generated by the balance circuit of this invention to correct any imbalance in the voltage across capacitor C1 when Q1 turns off and in the voltage across C2 when Q2 turns off.

Figure 1:
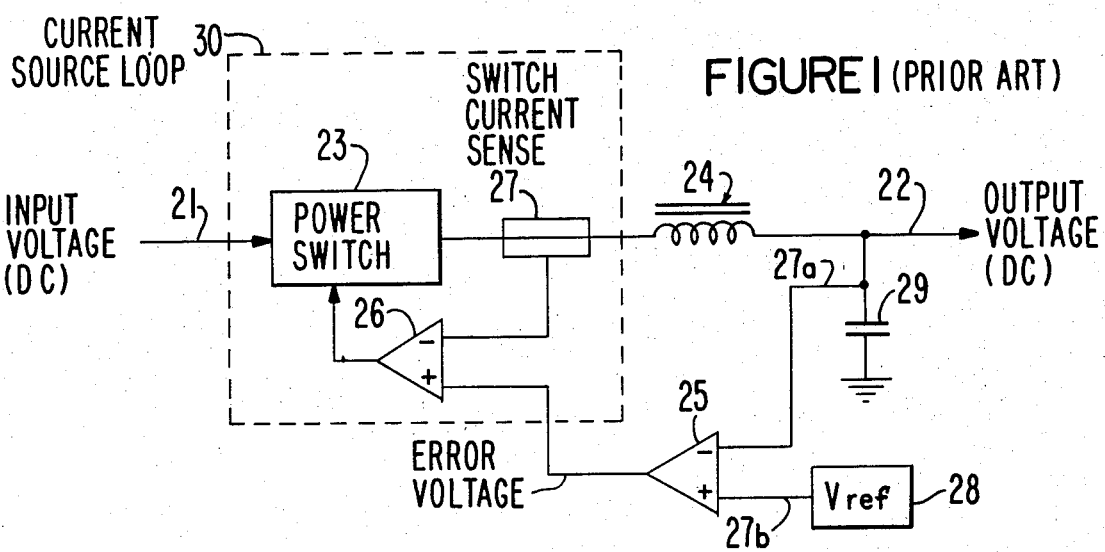
FIG. 1 illustrates a current mode control switching power supply of the prior art.

When Q1 or Q2 turns on and current starts flowing in the primary of T1, the current in the secondary of transformer T2 is rectified via diodes D3 and D4. A voltage across resistor R10 is produced by this current that is proportional to the primary current in T1. This voltage is supplied to the inverting input lead to comparator 42 via resistor R11 and provides the inner current loop feedback signal (corresponding to the current within loop 30 in FIG. 1). Also, whenever Q1 and Q2 is on, there will be a voltage across primary P of T3 (the output choke). This voltage will normally have the same value for a turn off of either Q1 or Q2 if the voltage across C1 just before turn off of Q1 is equal to the voltage across C2 just before turn off to Q2 (this represents a balanced condition). Whenever the voltages on C1 and C2 become different at these two times (out of balance) the voltage across T3 primary will be one value while Q1 is on and another value Q2 is on. The voltage across the primary of T3 is coupled through to the secondary and inverted and applied to lead 52 (the inverting input lead) of comparator 42 through series-connected capacitor C6, resistor R6 and forward biased diode D6.

Figure 3:
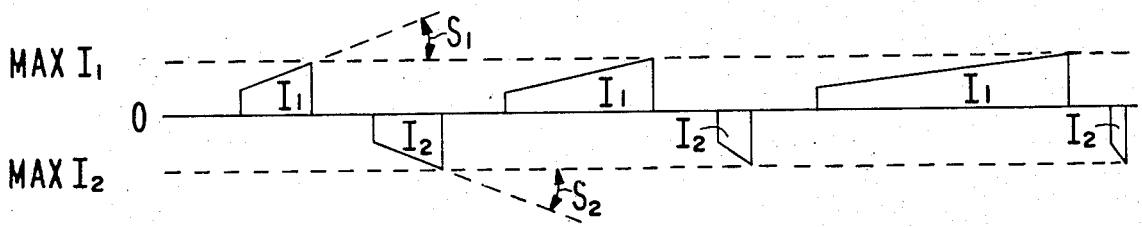
FIG. 3 illustrates the imbalance in the currents $I_1$ and $I_2$ through the primary "PRI" of transformer T1 which results in eventual latch up of the structure of FIG. 2a when this structure is used in a power switch such as power switch 23 of FIG. 1.

The voltage from the secondary of T3 is applied to series connected capacitor C6, resistor R6 and forward biased diode D6 to produce a related voltage on lead 52 connected to inverting input lead of comparator 42. This voltage on lead 52 determines the current which must flow through the primary P of T1 in order to produce a voltage on lead 58 which results in the voltage on lead 52 balancing to and equalling the voltage on the noninverting input lead of comparator 42. The result of this is effectively to shift the limits Max $I_1$ and Max $I_2$ as shown in FIG. 3 at which transistors Q1 and Q2 turn off so as to correct any imbalance in the voltages across capacitors C1 and C2 when their respective transistors Q1 and Q2 are ready to turn off.

The function of much of the circuitry in block 48 is simply to momentarily ground lead 57 connected to one terminal of capacitor C6 to restore the voltage of this point to zero during "storage time" of Q1 or Q2. Storage time is defined as that time after current comparator 42 has its output lead pulled low, but before either Q1 or Q2 has had enough time to turn off.

Comparator 42 comprises an LM339 comparator produced, for example, by National Semiconductor Corporation. This comparator has an open collector output lead which pulls down the voltage across capacitor C4 whenever the signal level on the inverting input lead to comparator 42 exceeds the signal level on the noninverting input lead to comparator 42. At this time, this voltage drop across capacitor C4 produces a signal to controller circuit 44 causing controller integrated circuit 44 to shut off either switching transistor Q3 or switching transistor Q4, whichever one was on. The time delay between the shutting off of Q3 and the shutting off of transistor Q1 controlled by Q3, or the shutting off of Q4 and the shutting off of transistor Q2 controller by Q4, is known as the storage time (see FIG. 5f) and represents the time required to sweep away charges stored on the base of Q1 or Q2 so that these devices will shut off. Typically, this time is two to three microseconds.

Control IC 44 in one embodiment as a TL 4 94 integrated circuit from Texas Instruments or Motorola, for example, the specifications of which are incorporated herein by reference. Other controllers can be used in place of a TL 494 if desired.

Driver 45 between controller IC 44 and transistors Q1 and Q2 is a common well known circuit, capable of a number of different configurations, which boosts the drive current from transistor Q3 to transistor Q1 and from transistor Q4 to transistor Q2. Driver 45 also isolates Q1 from Q2 and Q3, Q4 from Q1, Q2.

The turning off of whichever one of transistors Q3 and Q4 was on produces a positive going one microsecond pulse through one of the two 270 pF capacitors C9, C10 attached to Q3 or Q4. This pulse turns on Q5 in balance circuit 48 and bleeds off any excess charge from capacitor C6 through lead 57 and diode D8. Q5 is on only for about one microsecond or less and turns off before Q1 or Q2 turns off. When Q1 or Q2 turns off the voltage across T1 becomes zero and the voltage across T3 reverses polarity. This reversal causes C7 to force diodes D12 and D11 into conduction (zener diode D11 breaks down) and causes comparator 41 to pull down lines 52 (inverting input lead to comparator 42) and 53. This prevents a latch up problem during turn on of the supply and during off time of transistors Q1 and Q2 caused by R12 charging C6 and holding the output of comparator 42 in a low state. Note that when Q1 and Q2 are on, the output lead of comparator 41 open circuits allowing current to flow through resistor R12 to C6. However, the time constant of components R12 and C6 is sufficiently large to prevent C6 from being charged significantly during this on time.

When Q1 or Q2 next turn on, C7 is driven negative by the reversal of polarity on the secondary of T3 and charges C8 (the positively charged plate of C8 is grounded) through diode D13 and R3. The voltage across C8 is clamped at about 1.4 to 1.6 volts by diodes D9 and D10 which provide enough voltage to make up for the forward drops of diodes D7 and D8. Diodes D7 and D8 prevent forward biasing the collectors of transistors Q6 and Q5 respectively when the voltage on lead 57 goes above and below ground, respectively. Q6 serves a similar restoring function as Q5 but puts charge into C6 during storage time. Whenever transistor Q3 or Q4 in integrated circuit 44 is on, emitter current from Q3 or Q4 flows through the base to collector junction of Q7 into ground. This holds the emitter of Q7 at about zero volts and prevents current through R2 from turning on Q6. When both Q3 and Q4 are off and line 54 is negative and Q1 or Q2 is on (i.e., during storage time), current through R2 turns on Q6 and restores the charge on C6 to one diode drop (D7) below ground.

Diodes D5 and D6 protect comparator 42 from excessive excursions in input voltage on lead 52.

The reason for restoring the charge on C6 during storage time is that this will result in no net change in the current limit of the power supply as set by the maximum output signal (typically about 5.7 volts as set by resistor R14 (1K ohms) and diode D13 connected to a five volt reference as shown) for different output voltages (on leads 50a and 50b) or input voltages (on leads 51a and 51b).

Figure 5A:
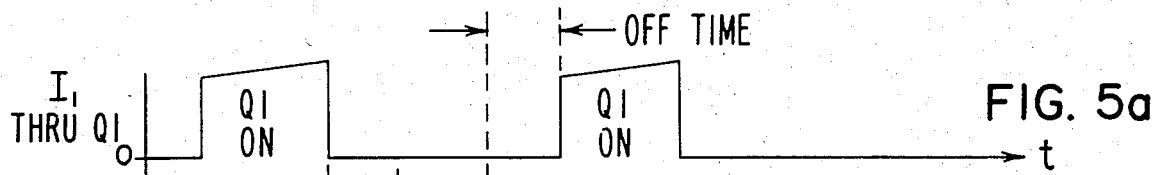
FIGS. 5a through 5h comprise waveforms of use in explaining the operation of this invention.
Figure 5B:
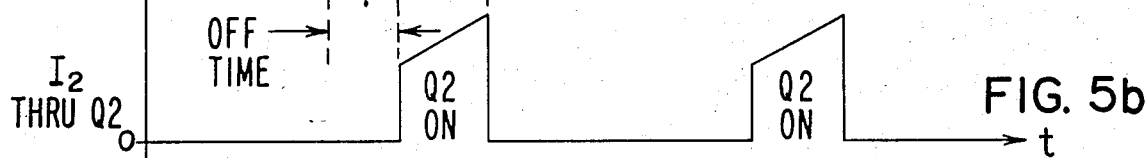
Figure 5C:
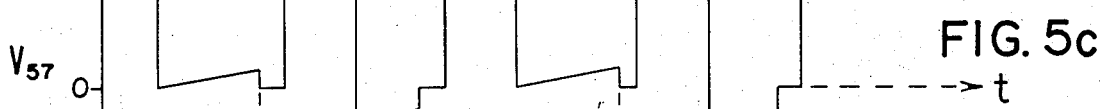
Figure 5D:
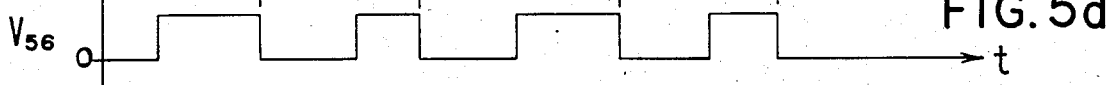
Figure 5E:
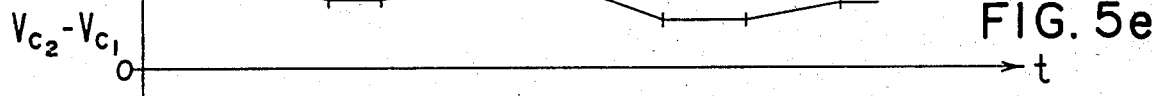
Figure 5F:
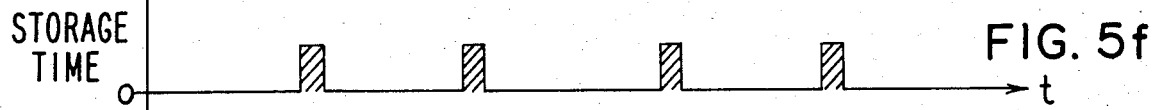
Figure 5G:
Figure 5H:
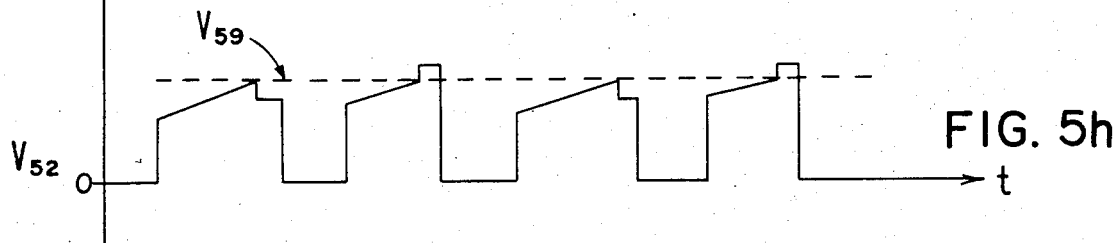

The operation of this invention will be further explained taking into consideration FIGS. 5a through 5g. As shown in FIGS. 5a and 5b, transistors Q1 and Q2 are on periodically but alternately. Thus Q2 is off while Q1 is on, and vice versa. However the time between the turning off of Q1 and the turning on of Q2 is called the "off time". During this time the voltage on node A as shown in FIG. 5e is flat and constant. When Q1 is on, Q1 is turned off by the turning off of Q3. The time difference between the turning off of Q3 and the turning off of Q1 is called storage time. Storage time is shown in FIG. 5f. During the storage time Q3 (or Q4) is off and Q1 (or Q2) is preparing to shut off. When Q1 (or Q2) turns off, the off time before the turning on of Q2 (Q1) is controlled by the controller integrated circuit 44 by controlling a voltage on what is called the "dead time pin" (pin 4) of the integrated circuit. The higher the voltage from the dead time pin of the TL 494, the longer the off time.

One key to this invention is the recognition that the oscillations illustrated in FIG. 3 can be eliminated by reducing max $I_1$ and increasing max $I_2$ (in terms of absolute value) to reduce the time duration of the $I_1$ current pulses and to increase the time duration of the $I_2$ current pulses. This shift in the currents through the primary of T1 at which Q1 and Q2 shut off, restores balance to the voltages across capacitors C1 and C2. Note that when switch Q1 is on, the voltage across the secondary of transformer T1 is a measure of the voltage across capacitor C1 and when Q2 is on and Q1 is off, the voltage across the secondary of transformer T1 is a measure of the voltage across capacitor C2. Thus the secondary of choke T3 measures the voltage across C1 when switch Q1 is conducting and the voltage across C2 when switch Q2 is conducting. The voltage output from the secondary of T2 represents the current $I_1$ or $I_2$, depending on whether Q1 or Q2 is on. However, the circuit of this invention feeds back negatively this voltage (note that the secondary winding of T3 is reversed compared to the primary of T3). Thus the voltage on lead 57, which represents approximately the voltage across C1 or C2, is negative, but rising as shown in FIG. 5c when Q1 or Q2 is on. At some time the voltage on lead 52 which represents an average of the voltages on leads 57 and 58 will rise and cause the output of comparator 42 to pull low. If the voltage across C1 is lower than the voltage across C2, then current $I_1$ normally will flow a relatively long time. The negative feedback will, however, reduce the time during which current $I_1$ flows by raising the initial voltage on line 57 (see FIG. 5c) when Q1 is turned on.

Comparator 42 is called an open collector comparator. As explained above, the open collector comparator 42 has its output lead pulled low when the voltage on the inverting input lead goes higher than the voltage on the non-inverting input lead. The result is to turn off whichever one of transistors Q3 or Q4 was on and thus turn off either Q1 or Q2, respectively. Assuming that Q1 had been on, Q1 would now turn off and thereby cause the voltage on the inverting input lead to comparator 42 to drop low again. Thus the output lead of comparator 42 will open circuit, capacitor C4 will charge from current flowing from the oscillator of integrated circuit 44. At some voltage across capacitor C4, transistor Q4 in integrated circuit 44 will turn on, thereby turning on switching transistor Q2. At this time the voltage on the secondary of T1 will be a measure of the magnitude of the voltage across capacitor C2. The current through the primary of T1 will be sensed by the current sense circuit including transformer T2. The output voltage on lead 58 will represent the current through the primary while transistor Q2 is on. Measures of the voltages on the secondary of T1 and on lead 58 will be summed on the inverting input lead 52 of comparator 42. If the voltage across capacitor C1 is larger than the voltage across capacitor C2 the voltage on lead 57 to be summed on the negative inverting input lead 52 of comparator 42 will start from a lower value (i.e., a more negative value) thereby extending the time period that switching transistor Q1 remains on and thereby correcting the imbalance shown in the current pulse widths in FIG. 3.

The time at which the voltage on the inverting input lead 52 to comparator 42 matches the voltage on the non-inverting input lead is known as the "current compare time" or the "current compare point". Immediately after comparator 42 pulls down the voltage on its output lead and shuts off whichever one of transistors Q3 and Q4 were on, the pulse resulting from the shutting off of this transistor is transmitted through capacitor C9 or C10 and on lead 55 (see FIG. 5g) to turn on transistor Q5. The turning on of transistor Q5 grounds lead 57 through diode D8. Actually lead 57 is not quite grounded but rather adopts a voltage of about 0.6 to 0.7 volts beneath ground because of the effect of the two forward biased diodes D9 and D10. At the same time, the voltage across R9 disappears and therefore Q7 is turned off. The turning off of Q7 allows R2 to pull down and turn on Q6, which pulls up lead 57 one diode drop below ground. The restoration of lead 57 and thus capacitor C6 to this voltage prevents a bias from building up across capacitor C6 which would result in a shift in the maximum current comparison point on lead 52 to comparator 42.

Variation in line voltage (i.e., the voltage on nodes 51a and 51b) will not affect the maximum output current produced by the power supply on nodes 50a and 50b. Should the voltages across capacitors C1 and C2 change because of a change in line voltage, these voltages will be reflected through transformer T1 to the secondary of choke T3 and will result in a change in voltage on line 57 to a more negative value. However, this is a transient effect and at the end of a half cycle, the turning on or Q5 and Q6 will bring line 57 back to approximately ground.

One feature of this invention of importance is that the feedback circuit which provides a measure of the DC voltage across capacitor C1 and C2 is DC isolated by the power transformer T1 in the power supply and by the choke T3 on the output of the power supply. Thus transformers T1 and T3 provided double isolation of the feedback path insuring that the power supply still meets UL requirements for isolation without requiring additional feedback paths.

As an additional feature, the balance circuit is not referenced to the output terminals 50a, 50b. The balance circuit 48 is inherently isolated from the output terminals 50a and 50b and thus allows the grounding of the balance control circuit 48 to be done independently of the grounding of the output terminals 50a and 50b.

Figure 2B:
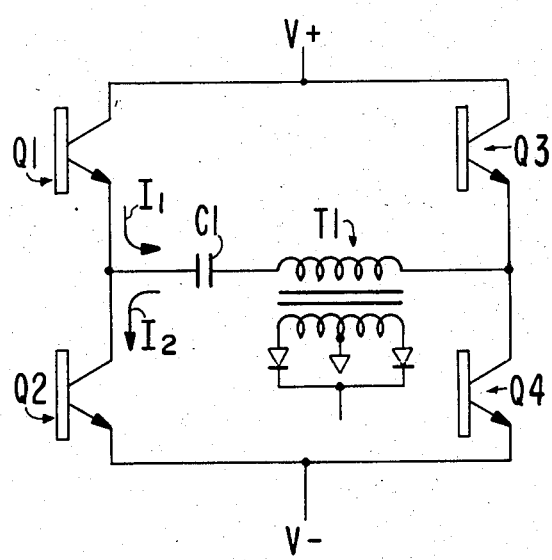
FIG. 2b illustrates a full bridge capacitor coupled power stage known in the prior art but not previously usable with a current mode controlled power converter.

FIG. 2b illustrates a full bridge capacitor coupled switching circuit also capable of being used with the balance circuit of this invention. In operation transistors Q1 and Q4 are turned on, allowing current $I_1$ to charge capacitor C1. Then transistors Q1 and Q4 are turned off and transistors Q2 and Q3 are turned on, allowing current $I_2$ to discharge capacitor C1. Any imbalance in the times $I_1$ and $I_2$ are on will cause capacitor C1 to charge fully as a result of the dominant current and thus latch up. The balance circuit of this invention shown in FIG. 4 will prevent this.

While one embodiment of this invention has been described, other embodiments will be obvious in view of the above disclosure.

I claim:

1. A power supply comprising:
   a first switch;
   a second switch;
   an output terminal;
   a transformer having a secondary winding coupled to said output terminal and a primary winding, said primary winding having a first lead coupled to said first and second switches, said primary winding having a second lead;
   a first capacitor coupled to said second lead;
   a second capacitor coupled to said second lead;
   means for closing said first switch, then opening said first switch, then closing said second switch, and then opening said second switch, current flowing through said primary winding in a first direction when said first switch is closed, current flowing through said primary winding in a second direction when said second switch is closed; and
   means for sensing the voltage across said first and second capacitors and reducing any inequality between the times said first and second switches are closed by an amount of time dependent on the magnitude of said sensed voltage.

2. A power converter comprising:
   an output transformer containing a primary and a secondary winding;
   switching means for providing a first current through said primary winding in a first direction and a second current through said primary winding in a second direction; and
   means for correcting an imbalance in the time during which said first current flows through said primary winding in the first direction and the time during which said second current flows through said primary winding in the second direction, said means for correcting comprising
      means for providing a measure of the time during which said first current flows through said primary winding in said first direction and of the time during which said second current flows through said primary winding in said second direction; and
      means for adjusting the time during which said first current flows through said primary winding in said first direction and the time during which said second current flows through said primary winding in said second direction to correct any inequality in said two times,
   and wherein said switching means comprises a series connection of a first switching transistor and a first capacitor in parallel with said primary winding, said switching means also including a series connection of a second switching transistor and a second capacitor connected in parallel with said primary winding, wherein said first switching transistor is off when said second switching transistor is on and said second switching transistor is off when said first switching transistor is on,
   and wherein said measure of the time said first current flows through said primary winding and said measure of the time said second current flows through said primary winding comprise a measure of the voltage across said first and second capacitors so that said power converter adjusts the time during which said first and second currents flow by an amount of time dependent on the magnitude of the voltage across said first and second capacitors.

3. A current mode control converter comprising:
   an output transformer having a primary winding;
   switching means for causing a first current to flow through said primary winding in a first direction during a first time period and a second current to flow through said primary winding in a second direction during a second time period;
   a control circuit for controlling said switching means, said control circuit having a tendency to create an instability such that one of said first and second time periods tends to increase in length and the other time period tends to decrease in length, thereby tending to cause said converter to latch up; and
   correction means for eliminating said instability by causing said first time period to tend to equal said second time period, said correction means comprising:
      means for providing a measure of the difference in duration of said first and second time periods; and
      means for adjusting the duration of said first and second time periods in response to said measure to reduce the inequality in said first and second time periods.

4. The power supply of claim 3 wherein said control circuit turns off current in said primary winding when said current exceeds a threshold value, said first current increasing at a first rate during said first time period until said first current reaches said threshold value, said first rate decreasing as said first time period increases relative to said second time period, thereby tending to cause said instability.

5. A current mode control power converter for converting a first voltage to a second voltage comprising a half bridge switching circuit including:
   a transformer with a primary winding and a secondary winding;
   a first capacitor;
   a first switching transistor, a series connection of said first capacitor and said first switching transistor being coupled in parallel with said primary winding;
   a second capacitor;
   a second switching transistor, a series connection of said second capacitor and said second switching transistor being coupled in parallel with said primary winding;
   means for switching said first switching transistor on when said second switching transistor is off and for switching said second switching transistor on when said first switching transistor is off;
   means for producing a first measure of the current through the primary winding when said first switching transistor is on and for producing a second measure of the current through the primary winding when said second switching transistor is on;
   means for producing a third measure of the output current required from said power converter;
   means for comparing said first measure with said third measure and for shutting off the current through said primary winding when said first measure exceeds said third measure each switching cycle of said power converter and for comparing said second measure with said third measure and for shutting off the current through said primary winding when said second measure exceeds said third measure each switching cycle of said power converter; and means for adjusting said first measure and said second measure to reduce any imbalance in the time current flows through said primary winding when said first switching transistor is on compared to the time current flows through said primary winding when said second switching transistor is on.

6. Structure as in claim 5 wherein said means for adjusting comprises a comparator containing an inverting input lead and a noninverting input lead;

means for deriving from the output voltage generated from said power converter a control signal representative of the current required to maintain said output voltage;

means for applying said control signal to said noninverting input lead of said comparator;

means for generating a first signal proportional to the current through the primary winding of said transformer;

means for generating a second signal representative of the integral of the difference in time between the time the first switching transistor is on and the time the second switching transistor is on;

means for combining the measure of the current through said primary winding with said first signal to produce an average signal for application to the inverting input lead of said comparator, whereby said comparator determines when the signal on said inverting input lead of said comparator exceeds the signal on said noninverting input lead of said comparator thereby to turn off whichever one of said first and second switching transistors is on.

7. Structure as in claim 6 further comprising means for turning on, following the lapse of a selected time period, whichever one of said first and second switching transistors was not just turned off.

8. A current mode control power supply comprising:

an output terminal;

a transformer having a secondary winding coupled to said output terminal and a primary winding;

switching means for causing a first current to flow through said primary winding in a first direction during a first time period and a second current to flow through said primary winding in a second direction during a second time period;

means for providing a control signal for determining the amount of output current provided by said power supply;

control means for controlling said switching means in response to said control signal and in response to the amplitude of the current through one of the windings of said transformer; and means for causing said control means to modify the duration of said first and second time periods so as to reduce any difference between the duration of said first and second time periods.

9. The power supply of claim 8 wherein said means for providing a control signal comprises a differential amplifier having a first input lead coupled to said output terminal and a second input lead receiving a reference voltage.

10. The power supply of claim 8 further comprising means for generating a voltage indicative of the amplitude of the current through said primary winding, said control means controlling said switching means in response to said voltage indicative of the amplitude.

11. The power supply of claim 10 wherein said means for causing comprises:

means for providing a second signal indicative of the difference between said first and second time periods;

means for providing a third signal having a component proportional to said voltage indicative of the amplitude and a component proportional to said second signal; and wherein said control means is a comparator comparing said control signal and said third signal.

12. The power supply of claim 8 wherein said switching means comprises first and second transistors coupled to a first lead of said primary winding, said power supply further comprising:

a first capacitor coupled to a second lead of said primary winding; and a second capacitor coupled to said second lead of said primary winding;

and wherein said means for causing comprises means for providing a third signal indicative of the voltage across said first and second capacitors.

* * * * *